(12) United States Patent
Roger et al.

(10) Patent No.: US 11,085,994 B2
(45) Date of Patent: Aug. 10, 2021

(54) RADAR SIGNAL PROCESSING

(71) Applicant: Infineon Technologies AG, Neubiberg (DE)

(72) Inventors: Andre Roger, Munich (DE); Romain Ygnace, Munich (DE)

(73) Assignee: Infineon Technologies AG, Neubiberg (DE)

( * ) Notice: Subject to any disclaimer, the term of this patent is extended or adjusted under 35 U.S.C. 154(b) by 333 days.

(21) Appl. No.: 16/159,957

(22) Filed: Oct. 15, 2018

(65) Prior Publication Data

US 2019/0129002 A1    May 2, 2019

(30) Foreign Application Priority Data

Oct. 26, 2017 (DE) .......................... 102017125156.1

(51) Int. Cl.
  *G01S 7/292*    (2006.01)
  *G01S 7/03*    (2006.01)
  *G01S 7/288*    (2006.01)
  *G01S 13/931*    (2020.01)

(52) U.S. Cl.
  CPC ............ *G01S 7/2927* (2013.01); *G01S 7/032* (2013.01); *G01S 7/288* (2013.01); *G01S 7/2926* (2013.01); *G01S 13/931* (2013.01); *G01S 2007/2883* (2013.01)

(58) Field of Classification Search
  CPC ........ G01S 7/2927; G01S 7/032; G01S 7/288; G01S 7/2926; G01S 2007/2883; G01S 13/931
  USPC ........................................................ 342/93
  See application file for complete search history.

(56) References Cited

U.S. PATENT DOCUMENTS 3,179,935 A * 4/1965 Blass ...................... G01S 13/24
                                                                      342/201
5,177,381 A * 1/1993 Friesen .................... G06G 7/24
                                                                      327/351
5,689,210 A * 11/1997 Lange ..................... H03F 3/607
                                                                      330/286

(Continued)

FOREIGN PATENT DOCUMENTS

DE         102014002284 A1 *  8/2014  ............... G01S 7/02
WO      WO-2018000683 A1 *  1/2018  ............... G06F 1/24

OTHER PUBLICATIONS

German Patent Office, Office Action issued for DE 102017125156.1, 6 pgs., dated Aug. 31, 2018.

*Primary Examiner* — Bernarr E Gregory
*Assistant Examiner* — Nuzhat Pervin
(74) *Attorney, Agent, or Firm* — Schiff Hardin LLP

(57) ABSTRACT

A radar device including at least three subcircuits, wherein each subcircuit has a cascade input port and a cascade output port and is chained such that the cascade output port of a first subcircuit is connected to the cascade input port of a subsequent subcircuit, the cascade input port of the last subcircuit of the chain is connected to the cascade output port of its preceding subcircuit, and the cascade output port of the last subcircuit of the chain is connectable to an external device, and wherein the at least three subcircuits are configured to conduct a radar computation in a distributed manner such that intermediate results are conveyed towards the last subcircuit of the chain which is configured to combine these results and supply them towards its cascade output port.

23 Claims, 11 Drawing Sheets

(56) References Cited

U.S. PATENT DOCUMENTS

| | | | | |
|---|---|---|---|---|
| 6,539,336 B1* | 3/2003 | Vock | A42B 3/0433 | 702/178 |
| 9,007,255 B2* | 4/2015 | Jarvis | G01S 7/40 | 342/20 |
| 9,667,317 B2* | 5/2017 | Gross | H04B 3/52 | |
| 2004/0155810 A1* | 8/2004 | Witten | G01S 7/28 | 342/22 |
| 2007/0153576 A1* | 7/2007 | Oh | G11C 7/1021 | 365/185.11 |
| 2009/0256620 A1* | 10/2009 | Okyay | H03K 17/002 | 327/403 |
| 2011/0050328 A1* | 3/2011 | Floyd | H02M 3/073 | 327/536 |
| 2011/0121900 A1* | 5/2011 | Muscha | H03K 5/1565 | 330/254 |
| 2013/0241625 A1* | 9/2013 | Perreault | G06G 7/12 | 327/355 |
| 2014/0133242 A1* | 5/2014 | Oh | G11C 7/1021 | 365/185.18 |
| 2014/0232586 A1* | 8/2014 | Ygnace | G01S 7/354 | 342/59 |
| 2015/0269396 A1* | 9/2015 | Grafton | G06F 21/74 | 726/2 |
| 2016/0018511 A1* | 1/2016 | Nayyar | G01S 13/878 | 342/27 |
| 2016/0041260 A1* | 2/2016 | Cao | G01S 13/522 | 342/129 |
| 2016/0170010 A1* | 6/2016 | Ygnace | G01S 13/02 | 342/196 |
| 2016/0187464 A1* | 6/2016 | Ginsburg | G01S 7/4008 | 342/168 |
| 2016/0211026 A1* | 7/2016 | Oh | G11C 16/3445 | |
| 2017/0033770 A1* | 2/2017 | Jordan | H03H 11/245 | |
| 2017/0038494 A1* | 2/2017 | Gelineau | G01V 8/20 | |
| 2017/0076789 A1* | 3/2017 | Oh | G11C 7/1021 | |
| 2017/0090015 A1* | 3/2017 | Breen | G01S 7/4056 | |
| 2017/0131394 A1* | 5/2017 | Roger | G01S 7/023 | |
| 2017/0365333 A1* | 12/2017 | Oh | G11C 7/1021 | |
| 2018/0045810 A1* | 2/2018 | Ygnace | G01S 7/354 | |
| 2018/0069316 A1* | 3/2018 | Dandu | H01Q 1/3233 | |
| 2018/0175831 A1* | 6/2018 | Reuter | G01S 7/032 | |
| 2018/0204628 A1* | 7/2018 | Gao | G11C 19/184 | |
| 2018/0210067 A1* | 7/2018 | Bilik | G01S 13/87 | |
| 2018/0335814 A1* | 11/2018 | Shao | G06F 1/24 | |
| 2019/0113371 A1* | 4/2019 | Bellandi | G01D 11/24 | |
| 2020/0242998 A1* | 7/2020 | Wang | G09G 3/20 | |

\* cited by examiner

RADAR SIGNAL PROCESSING

BACKGROUND

Embodiments of the present disclosure relate to radar applications, in particular an efficient way to process radar signals obtained by at least one radar sensor, e.g., via at least one antenna. Processing radar signals in this regard in particular refers to radar signals received by a sensor or an antenna.

Several radar variants are used in cars for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e. a signal distributed across the frequency. The amplitude of the signal may indicate an amount of echo, wherein a peak may represent a target that needs to be detected and used for further processing, e.g., adjust the speed of the car based on another car travelling in front.

A radar processing device may provide different types of outputs, e.g., a command to a control unit, an object or an object list to be post-processed by at least one control unit, at least one FFT peak to be post-processed by at least one control unit. Utilizing FFT peaks enables high performance post processing.

Constant false alarm rejection (CFAR), also referred to as constant false alarm rate, is in particular known as a threshold method for FFT result analysis which may be based on a signal power. CFAR allows adapting a threshold to decide whether the FFT signal indicates a potential target. CFAR in particular considers background noise, clutter and interference. Several CFAR algorithms are known. For details, reference is made to http://en.wikipedia.org/wiki/Constant_false_alarm_rate.

CFAR may be used as one approach to select FFT peaks, e.g., by comparing such peaks with predefined thresholds.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

There is an increasing demand for angular resolution, azimuth and elevation processing in particular because of the increasing demand for autonomous driving applications of vehicles, e.g., cars. This results in an increasing number of receiving channels that are subject to signal processing in the field of radar applications.

A radar unit may be realized as having an MMIC unit (MMIC: monolithic microwave integrated circuit) with or without an integrated processing capability (e.g., an integrated pre-processor). Each radar unit may hence more or less autonomously pre-process radar data and convey pre-processed radar data to a central processing component, e.g., an electronic control unit (ECU) of the vehicle. Also, raw (i.e. not pre-processed) radar data may be conveyed directly to this central processing component.

On the other hand, a MMIC unit may have to be efficient with regard to its size and the number of pins (terminals), which may limit the possibilities to connect the MMIC unit. However, limiting the total number of available pins per MMIC unit may increase the number of MMIC units.

Hence, it is suggested to provide a distributed processing approach using several, e.g., cascaded, MMIC units in the same radar system. The MMIC unit may comprise an RFCMOS (radio frequency CMOS) radar system on chip (SoC).

Such distributed (pre-)processing may in particular be conducted in a coordinated manner.

The digital pre-processing may in particular be distributed among several MMIC units. The MMIC units may have identical structure (or at least substantially identical structure) or they may comprise a structural portion (i.e. a portion of circuitry) that is identical or at least similar for all MMIC units. Hence, the distributed pre-processing concept suggested herein is flexibly scalable.

Figure 1:
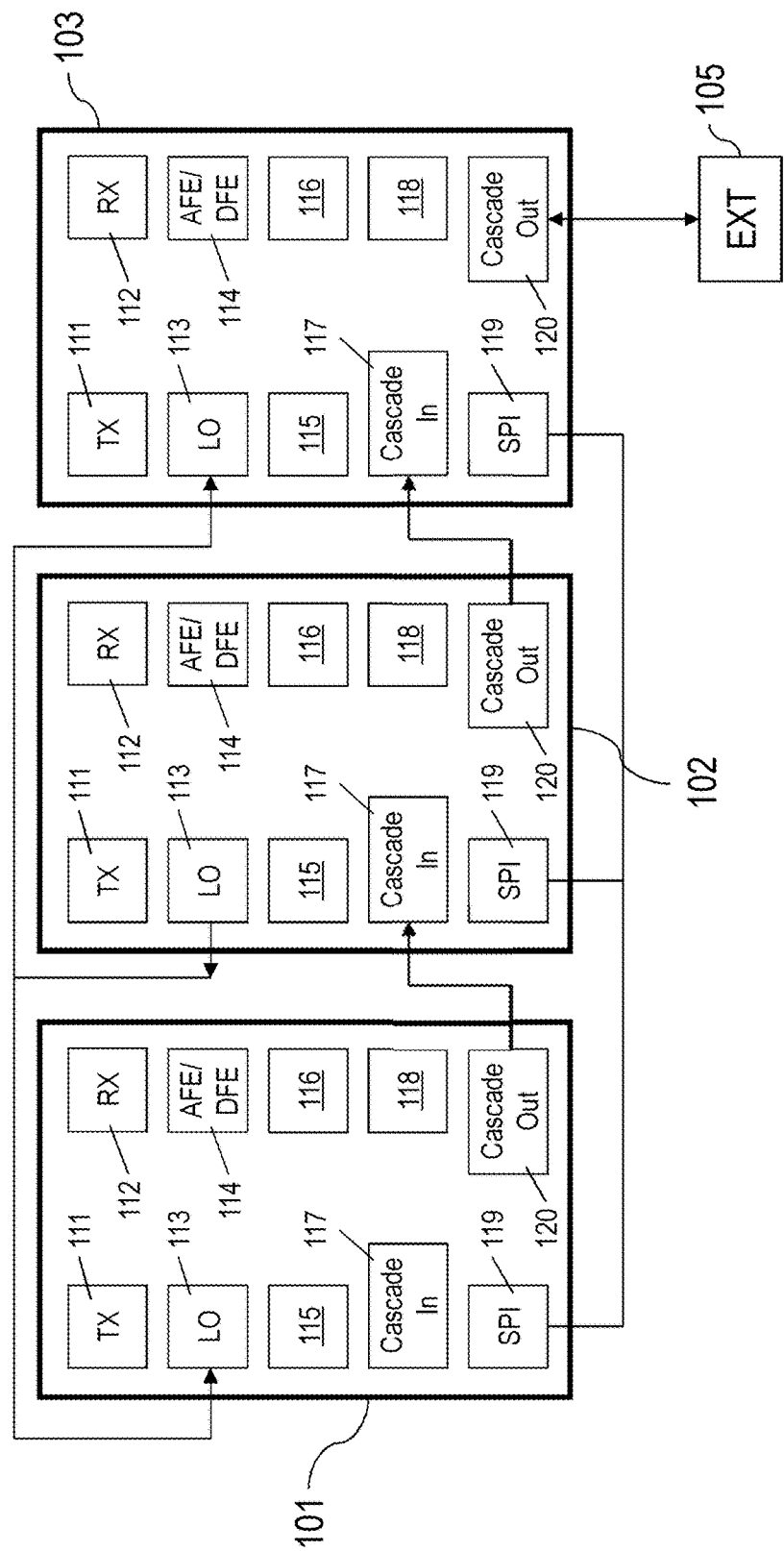
FIG. 1 shows an exemplary arrangement comprising several MMIC units, wherein a unidirectional communication link is used to convey computation results between the MMIC units and wherein a serial peripheral interface is used to convey commands from a digital processing master (i.e. the MMIC unit at the end of the chain of cascaded MMIC units) to the digital processing slaves.

FIG. 1 shows an exemplary arrangement comprising several MMIC units 101, 102 and 103. The MMIC units 101 to 103 all show the same internal structure, i.e. each of the MMIC units 101 to 103 comprises:
- a transmitter unit 111 (which may comprise several transmitters connected to at least one antenna, in particular one transmitter per antenna);
- a receiver unit 112 (which may comprise several receivers connected to at least one antenna, in particular one receiver per antenna);
- a local oscillator (LO) input/output unit 113 (also referred to as LO unit comprising at least one LO port);
- an analog front-end (AFE) and a digital front-end (DFE) 114;
- a ramp generator and a clock generator 115;
- a debug interface 116;
- a cascade input port 117;
- a processing unit 118 comprising at least one of the following: a signaling processing unit (SPU), a central processing unit (CPU), a memory (e.g., RAM, ROM, Flash memory or the like);
- a serial peripheral interface (SPI) 119;
- a cascade output port 120.

In the example shown in FIG. 1, the MMIC unit 103 acts as master and the MMIC units 101, 102 act as slaves. The serial peripheral interfaces 119 of the MMIC units 101 to 103 are connected with each other. Also, the cascade output port 120 of the MMIC unit 101 is connected to the cascade input port 117 of the MMIC unit 102 and the cascade output port 120 of the MMIC unit 102 is connected to the cascade input port 117 of the MMIC unit 103. The result of the cascaded processing provided by the MMIC units 101 to 103 is conveyed via the cascade output port 120 of the MMIC unit 103 towards an external unit 105.

In this example, the local oscillator signal is supplied from the LO unit 113 of the MMIC unit 102 to the LO units of the MMIC units 101 and 103.

The MMIC unit 103 is the digital processing master and it is arranged such that it is the last in the chain of the MMIC units, i.e. the last MMIC unit among the three cascaded MMIC units 101 to 103.

In addition, in the example shown in FIG. 1, the MMIC unit 102 is an RF (radio frequency) master device. This MMIC unit 102 generates the local oscillator (LO) radar signal and supplies it to the other MMIC units 101 and 103, which are the RF slave devices in this example.

The examples described herein in particular flexibly utilize the concept of having a digital processing master and several digital processing slaves as well as having a RF master device and several RF slave devices, wherein the digital processing master and the RF master device may or may not share the same MMIC unit, but different MMIC units. It is also an advantage that albeit the different master/slave roles regarding digital processing as well as RF processing, the identically built (or similarly built) MMIC units can be used and can be flexibly assigned master/slave roles with regard to both, i.e. the digital processing as well as the RF processing.

This concept of cascading MMIC units utilizes a fast cascaded link towards the digital processing master (here the MMIC unit 103) via the cascade input ports 117 and the cascade output ports 120 of the digital processing slaves (here the MMIC units 101 and 102).

The cascade output port 120 of the MMIC unit 103 may be connected to an external unit 105, e.g., an external switch or an external device. The external unit 105 may be another processing device or it may be connected to such additional processing device, e.g., via a communication interface (not shown in FIG. 1). The external unit 105 may be part of a processing structure of a vehicle or a car. The external unit 105 may be an ECU of the vehicle.

The SPIs 119 are used as an exemplary link between the MMIC units 101 to 103. This link is used to convey commands (for configuration, monitoring and/or signal acquisition purposes) from the digital processing master (i.e. the MMIC unit 103) to the digital processing slaves (i.e. the MMIC units 101 and 102) and/or from the RF master (here the MMIC unit 102).

Example: Distributed Cooperative Radar Processing

As an example, distributed cooperative radar processing between MMIC units may be used to compute FFT peaks and convey energy values and/or complex values of these peaks for each antenna. Also, information regarding adjacent peaks can be supplied.

Master-Slave-Communication: In this example, the digital processing master and the digital processing slaves are coupled via a serial peripheral interface (SPI) as is shown in FIG. 1 for the MMIC units 101 to 103.

Slave-Master-Communication: In the example shown in FIG. 1, a fast cascading unidirectional link is used to convey information from the MMIC unit 101 to the MMIC unit 102 and then to the MMIC unit 103. The cascading unidirectional link (also referred to as unidirectional communication) utilizes the cascade input ports 117 and the cascade output ports 120 of the MMIC units 101 to 103. In this regard, the MMIC units 101 to 103 are "chained" in a way that the MMIC unit 103 (i.e. the digital processing master) is the last MMIC unit of the chain. Hence, fast communication is used to convey information back to the signal processing master using cascaded unidirectional communication.

The cascading unidirectional link can be implemented for example by using a differential clock signal and a differential data signal. Also, partial computing results like partial non-coherent integration of data may be supplied by the individual MMIC units. Further, data of selected FFT peaks may be processed and passed on.

Master-to-Car-Communication: The digital processing master (here the MMIC unit 103) may advantageously have a connection to the external unit 105, e.g., a vehicle or car (e.g., an electronic control unit (ECU) of the car) via its cascade output port 120. For example, the cascade output port 120 of the MMIC unit 103 is connected via a Gigabit Ethernet connection to the network of the car. Differential clock-out and differential data-out may share the same pins as does the cascade output port 120.

The communication link may be
- unidirectional by having a cascade output port that supports only unidirectional communication;
- unidirectional by having a cascade output port that supports bidirectional communication, but only uses output signals;
- bidirectional by having a cascade output port that supports bidirectional communication.

It is also an option that the chain comprising in particular the MMIC units 101 and 102 may use circuitry supporting bidirectional communication; however, such circuitry may be arranged such that only output signals are used as signals conveyed to the cascade input port of the subsequent MMIC unit.

Figure 2:
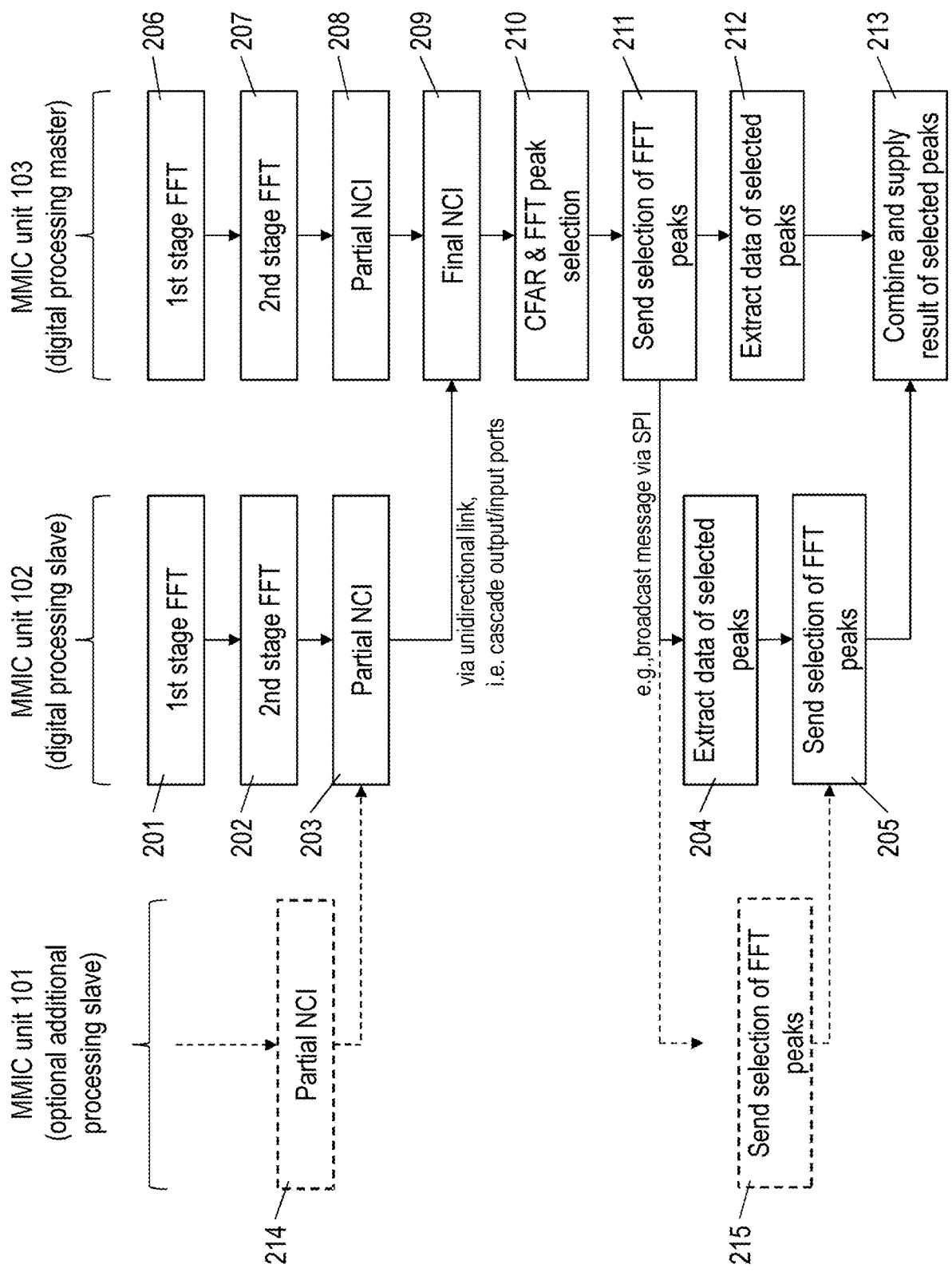
FIG. 2 shows an exemplary flow diagram between MMIC units to enable an efficient distributed computation.

FIG. 2 visualizes an exemplary data flow between the MMIC units (101,) 102 and 103.

The slave MMIC unit 102 in a step 201 conducts a first stage FFT, then in a step 202 a second stage FFT and in a subsequent step 203 a partial non-coherent integration. The step 203 may utilize information from a step 214. The step 214 has been performed by another MMIC unit (e.g., the MMIC unit 101) and has conducted a partial non-coherent integration. The result of this operation conducted in the step 214 may optionally be supplied to the MMIC unit 102 via its cascade input port 117 as explained above.

Hence, the MMIC units conduct concurrently first stage FFTs (steps 201, 206) and then second stage FFTs (steps 202, 207). The MMIC unit 101 being the first in the signal processing chain computes a partial non-coherent integration in step 214 and sends it to the MMIC unit 102. The MMIC unit 102 then computes a partial non-coherent integration in step 203 based on the sum of the partial non-coherent integration received from the MMIC unit 101 and based on its local non-coherent integration and sends it to the MMIC unit 103.

The master MMIC unit 103 in a step 206 conducts a first stage FFT, then in a step 207 a second stage FFT, in a next step 208 a partial non-coherent integration and in a subsequent step 209 a final non-coherent integration. In the step 209, the MMIC unit 103 utilizes information from the step 203, which is conveyed from the MMIC unit 102 via its cascade output port 120 and received by the MMIC unit 103 via its cascade input port 117.

Next, in a step 210, the MMIC unit 103 may conduct CFAR and FFT peak selection. In a subsequent step 211, the MMIC unit 103 selects FFT peaks and conveys this selection via a broadcast message utilizing the serial peripheral interfaces 119 towards the MMIC units (101 and 102), i.e. the digital processing slaves.

The MMIC unit 102 in a step 204 extracts data corresponding to the selection received and in a subsequent step 205 it may send data of the peaks selected based on additional information obtained from the MMIC unit 101.

The MMIC unit 101 also received the broadcast message comprising the selection of FFT peaks and may use them for further processing. In a step 215 the MMIC unit 101 sends a selection of peaks to the MMIC unit 102, which is then subject to a further selection in the step 205.

As described above, the results of the step 215 are conveyed via the cascade output port 120 of the MMIC unit 101 to the cascade input port 117 of the MMIC unit 102 and the results of the step 205 are conveyed via the cascade output port of the MMIC unit 102 to the cascade input port 117 of the MMIC unit 103.

The MMIC unit 103 subsequent to the step 211 in a step 212 extracts data of the peaks selected and in a step 213 combines data and supplies the combined data, e.g., data of the peaks selected from the MMIC unit 102 (see the step 205) and peaks determined by its local computation, via its cascade output port 120 to the external unit 105 and/or the peaks selected may be used for further processing purposes by the MMIC units 101 to 103 as will be shown in FIG. 3 below.

This distributed processing mechanism can be applied to various computation stages throughout radar applications. One example is interference mitigation.

The following shows an example of a distributed processing approach based on the FFT peak selection as described above where each MMIC unit computes an angle based on a subset of FFT peaks provided.

Figure 3:
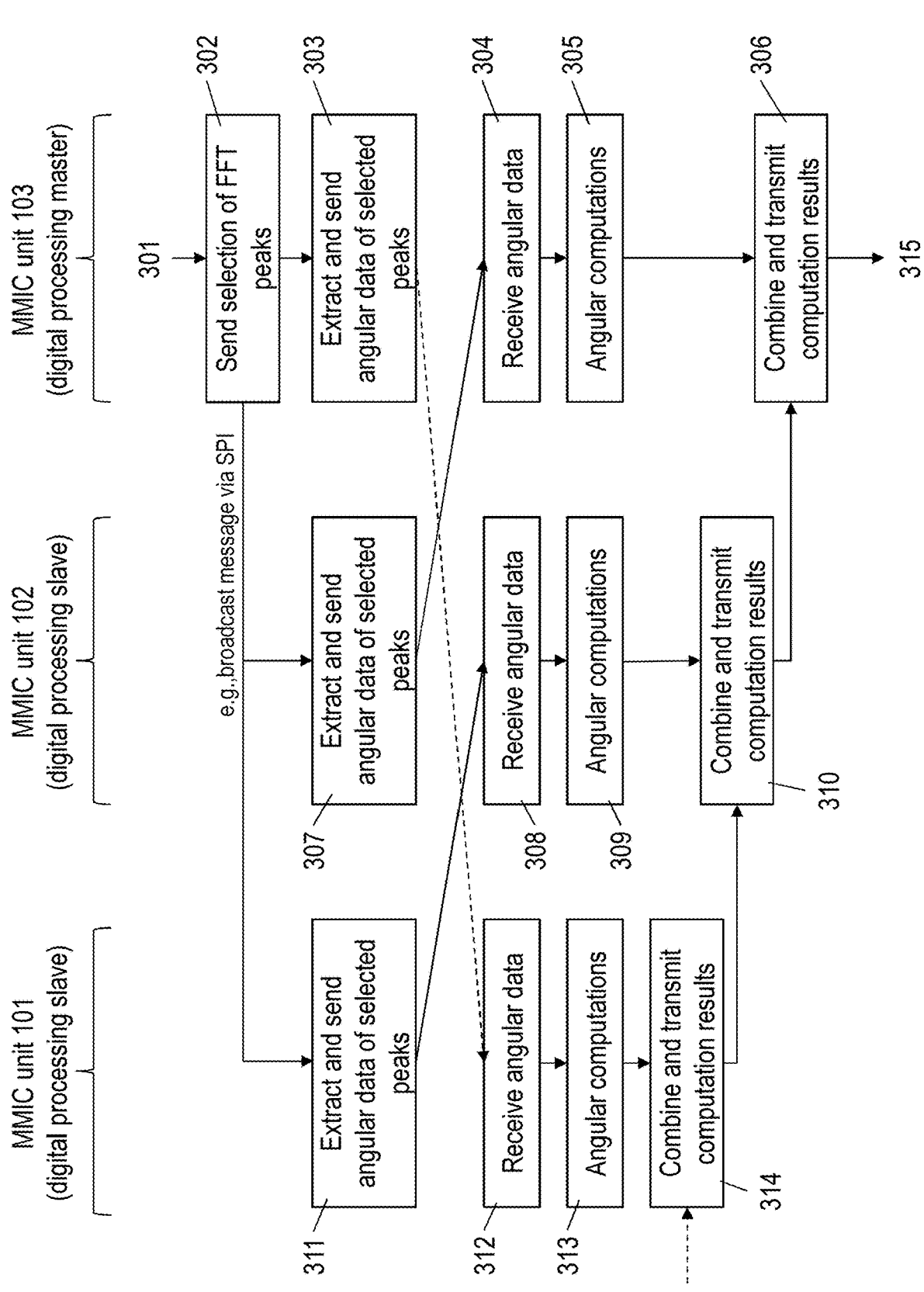
FIG. 3 shows another exemplary flow diagram between the MMIC units for an efficient distributed computation towards an angular computation.

FIG. 3 shows the MMIC units 101, 102 and 103, wherein the MMIC unit 103 is the digital processing master and the MMIC units 101, 102 are the digital processing slaves.

A signal 301 may correspond to the output of the step 213 of FIG. 2 providing the FFT peaks selected. In a step 302 the MMIC unit 103 processes the signal 301 and sends a command via the serial peripheral interface 119 to the MMIC units 101 and 102. This command may be sent as a dedicated command to each of the MMIC units 101, 102 or it may be broadcasted to the MMIC units 101, 102. The command may define which of the MMIC unit 101, 102 has to compute which angular computation and may define which of the MMIC units 101, 102 has to send FFT peaks to the other MMIC units.

As stated before and as is shown in FIG. 1, the command is conveyed across the SPI 119, which is present in each of the MMIC units 101 to 103. In addition, the unidirectional link (chained link) exists that utilizes the cascade output/input ports 120, 117 of the respective MMIC units 102 to 103.

Based on the command, the MMIC unit 102 in a step 307 extracts angular data of selected peaks and conveys it via the unidirectional connection to the MMIC unit 103.

Accordingly, also based on the command received from the MMIC unit 103 (via the SPI 119), the MMIC unit 101 in a step 311 extracts angular data of selected peaks and conveys it via the unidirectional connection to the MMIC unit 102.

In a step 308, the MMIC unit 102 receives the angular data from the MMIC unit 101 and in a subsequent step 309, the MMIC unit 102 conducts angular computations based on the data supplied by the MMIC unit 101 and based on its own data. In a step 310, the computation results (e.g., angular information regarding selected peaks) are conveyed via the unidirectional connection towards the MMIC unit 103.

In a step 304, the MMIC unit 103 receives the angular data from the MMIC unit 102 and in a subsequent step 305, the MMIC unit 103 conducts angular computations based on the data supplied by the MMIC unit 102 and based on its own data. In a step 306, the computation results from the step 305 as well as the information supplied by the MMIC unit 102 in the step 310 result in angular peaks (results of the angular computations) and these are communicated via the cascade output port 120 of the MMIC unit 103 to the external unit 105, e.g., car (see arrow 315).

It is an option that the distributed processing may even utilize the processing capabilities of the MMIC units 101 and 103 in a (further) circular way: In this scenario, the MMIC unit 103 may in a step 303 extract angular data of selected peaks and conveys this extracted data, e.g., via the unidirectional connection (back) to the MMIC unit 101. For this purpose, the cascade output port 120 of the MMIC unit 103 is connected to the cascade input port of the MMIC unit 101. The MMIC unit 101 in a step 312 receives the angular data from the MMIC unit 103 and in a subsequent step 313, the MMIC unit 101 conducts angular computations based on the data supplied by the MMIC unit 103 and based on its own data. In a step 314, the computation results are conveyed via the unidirectional connection towards the MMIC unit 102. Hence, the MMIC unit 102 may in the step 310 also consider these computation results from the MMIC unit 101 (supplied in this step 314).

It is also an option that the step 312 receives angular data from another MMIC unit different from the MMIC units 102 or 103.

It is a further option that a partial coherent or non-coherent integration on an MMIC unit may be started prior to the completion of all second stage FFTs. This may reduce the time latency of the serial communication.

Hence, the concept described herein is a flexible approach to allow for a distributed processing of, e.g., angular computations. It is noted, however, that different computations may be performed accordingly.

Each of the MMIC units 101 to 103 may thus have a part of a so-called data cube in its memory. Processing the portion of the data cube in a distributed way enables an efficient approach to quickly process complex operations, e.g., determine angular computations to find angular peaks that can be subject for further processing.

A radar data cube provides an intuitive way to represent radar processing as a function of space and time. The radar data cube may be perceived as a three-dimensional block with the radar returns of a single pulse represented along a first axis, returns from additional receiver elements along a second axis, and a collection of the returns from multiple pulses along a third axis (see, e.g., https://de.mathworks.com/company/newsletters/articles/building-and-processing-a-radar-data-cube.html).

Based on the distributed computation described herein, each MMIC unit 101 to 103 may pass a portion of the overall computation (result) to a subsequent stage, wherein each next stage in particular combines the results of the previous stages. Stage in this regard refers to a processing stage provided by each MMIC unit 101 to 103.

The MMIC unit 103 as the digital processing master is the "last in the line" and it may thus efficiently provide the results of the distributed computation internally and/or externally. These results may be subject to further (distributed or linear) computations to, e.g., eventually determine an object in front, behind or at a side of a vehicle, in particular a car.

According to one example, the digital processing master may send to an electronic control unit (ECU) of the vehicle for each peak detected:
 a range information,
 a Doppler information,
 an angle (azimuth and/or elevation) of an object detected,
 an energy information.

It is another option that the digital processing master supplies information, e.g., energy data of adjacent peaks and/or complex data for each (physical or virtual) antenna of adjacent bins.

Master-Slave Communication

It is an option to provide a (partial) data reduction along the MMIC units that are "chained" via the unidirectional connection. This may in particular apply to the MMIC units other than the digital processing master.

Instead of conveying the complete data from the MMIC unit 101 and from the MMIC unit 102 towards the MMIC unit 103 (i.e. the digital processing master), a (partial) reduction of these data may be introduced at each or at least at one of the processing stages.

The reduction of data may comprise a partial non-coherent integration (NCI) or a partial coherent integration (CI).

Figure 4:
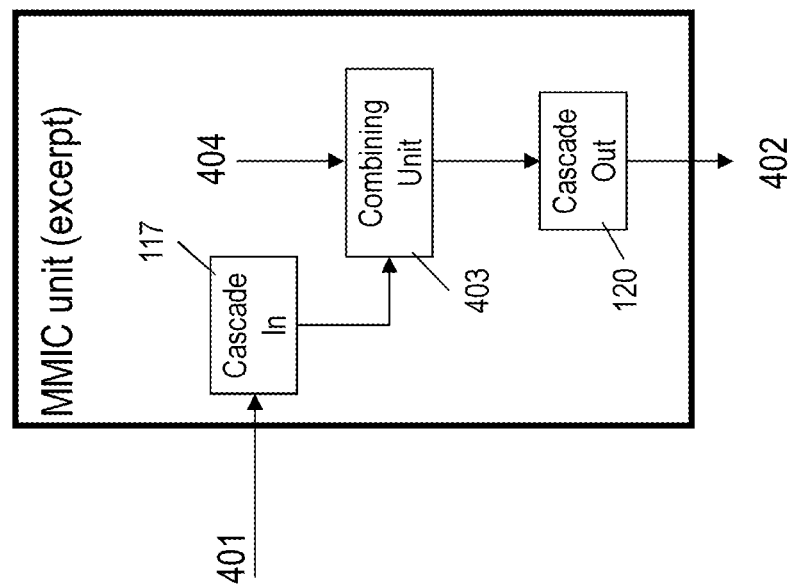
FIG. 4 shows a portion of an MMIC unit comprising a combining unit that helps producing a computation result, which is supplied at the cascade output port of the MMC unit.

FIG. 4 shows a portion of an MMIC unit to visualize an example as how the cascade input port 117 and the cascade output port 120 can be connected. The processing shown in FIG. 4 may be implemented in each of the MMIC units 101 to 103.

A signal 401 from a previous stage (i.e. a previous MMIC unit) is supplied to the cascade input port 117, which is connected to a combining unit 403 (e.g., a summation unit). Also, a signal 404 is fed to the combining unit 403. This signal 404 is provided by the current stage (i.e. the MMIC unit comprising the combining unit 403). The combining unit 403 is connected to the cascade output port 120, which supplies a cumulated signal 402 to the next stage (i.e. a subsequent MMIC unit or the external unit 105).

The signal 401 may be a partial NCI signal, the combining unit may conduct a partial non-coherent integration and the cumulated signal 402 may be a partial NCI signal.

As an alternative, the signal 401 may be a partial CI signal, the combining unit may conduct a partial coherent integration and the cumulated signal 402 may be a partial CI signal.

Data Tracing

It is an option to utilize the unidirectional connection, i.e. the cascade ports, for data tracing purposes like, e.g., tracing of analog-to-digital converted data. This may in particular be done during dedicated time slots.

For the purpose of data tracing, in particular raw data may be traced and such raw data can be made available (at least temporarily) at the cascade output port 120. The raw data may be compiled in Ethernet messages. This allows utilizing available Ethernet-based tools for raw data transmission and/or processing. Raw data may be any data that is analog-to-digital converted. Such raw data may in particular be supplied by the AFE/DFE 114.

The cascade output ports 120 of the MMIC units 101, 102 acting as digital slave processing devices can be used for tracing raw data during time periods when the unidirectional connection, i.e. this port, is not used. During data tracing, the cascade input ports can be configured to not acquire data from a preceding MMIC unit so that there is no unwanted increase of computation load for the involved MMIC units.

The cascade output port 120 of the MMIC unit 103 (being the digital processing master) may be connected to an Ethernet switch, which allows selecting between data to be sent to the external unit 105, e.g., the ECU, for further processing and tracing data (in particular such data that is not sent to the external unit 105). The selection may be achieved via VLAN tags of the Ethernet messages (VLAN: virtual local area network). The Ethernet switch may be controlled by the MMIC unit 103 to ensure that the payload (i.e. signals destined for the external unit 105) is separated from the tracing data.

Timeline, Scheduling

Figure 5:
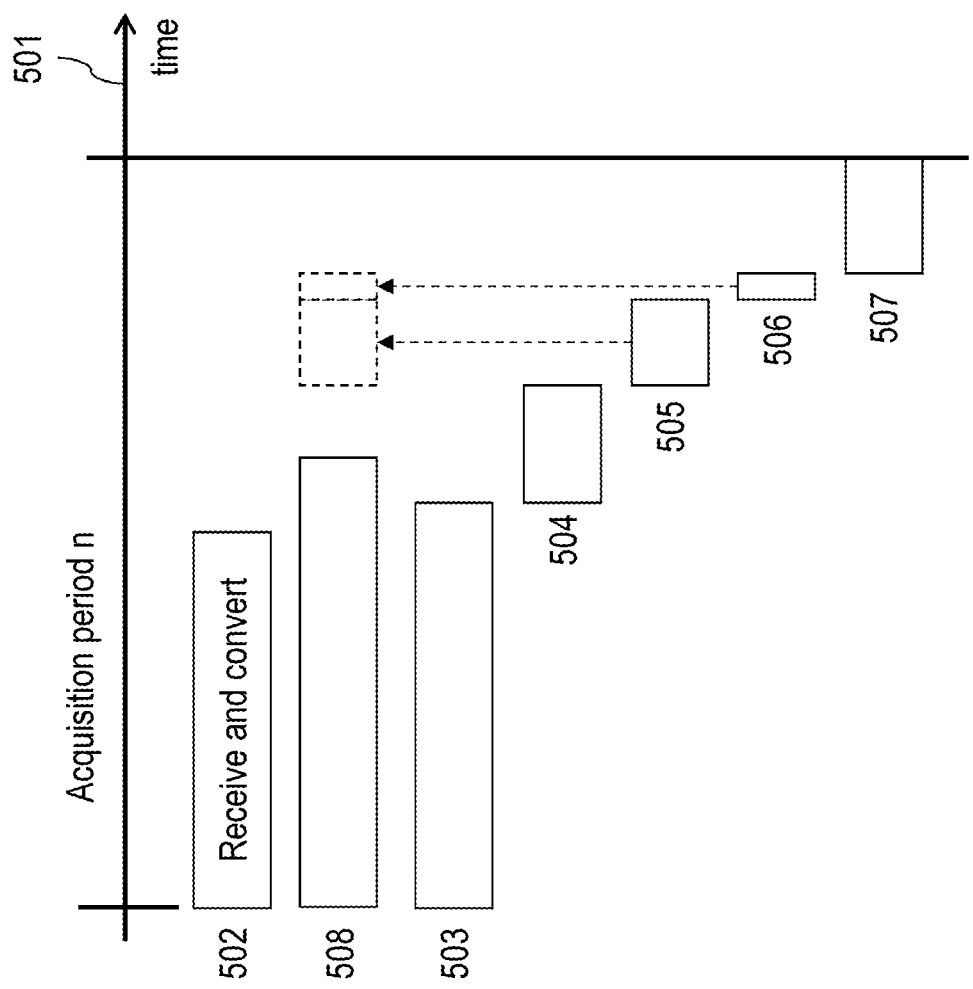
FIG. 5 shows a timeline 501 comprising an acquisition period n, during which radar signals are received and processed by the MMIC unit.

FIG. 5 shows a timeline 501 comprising an acquisition period n. During this acquisition period n, in a step 502 radar signals are received at the at least one antenna of an MMIC unit. The received analog signals are then converted into digital signals.

Next, in a step 503, a first stage FFT is conducted. The steps 502 and 503 may be executed almost simultaneously, except for some time difference due to internal pipelining effects.

In a subsequent step 504, a second stage FFT and a non-coherent integration (of the results of the first stage FFT) is conducted.

In a next step 505, the results of the non-coherent integration are transmitted.

In a follow-up step 506, FFT peaks are determined and transmitted towards the digital master processor (here the MMIC unit 103)

Then, the digital processing master combines the information available and sends—in a step 507—the FFT peaks to the external unit 105, e.g., the ECU of the vehicle.

All steps 502 to 507 may be sequentially conducted and define the duration of the acquisition period n.

During the steps 502, 503 and 504, the raw data may be made available at the cascade output ports (see reference 508), because these ports are only used during the transmitting steps 505 and 506. Hence, by utilizing multiplexing in the time domain during the acquisition period n, the raw data can be supplied for tracing purposes as well as the computed data can be transmitted to the subsequent stage (or the ECU) via the cascade output ports 120. In other words, the raw data can be made available at the cascade output port 120 when this port is not used for data transmission purposes towards the subsequent MMIC unit (or the external unit 105). In this example, such transmission only occurs during steps 505 and 506; the remaining time can be utilized for supplying raw data at the cascade output port 120. This applies for each of the MMIC units 101 to 103.

Circular Cascading

As an option, a circular cascading scheme can be utilized by the MMIC units.

Figure 6:
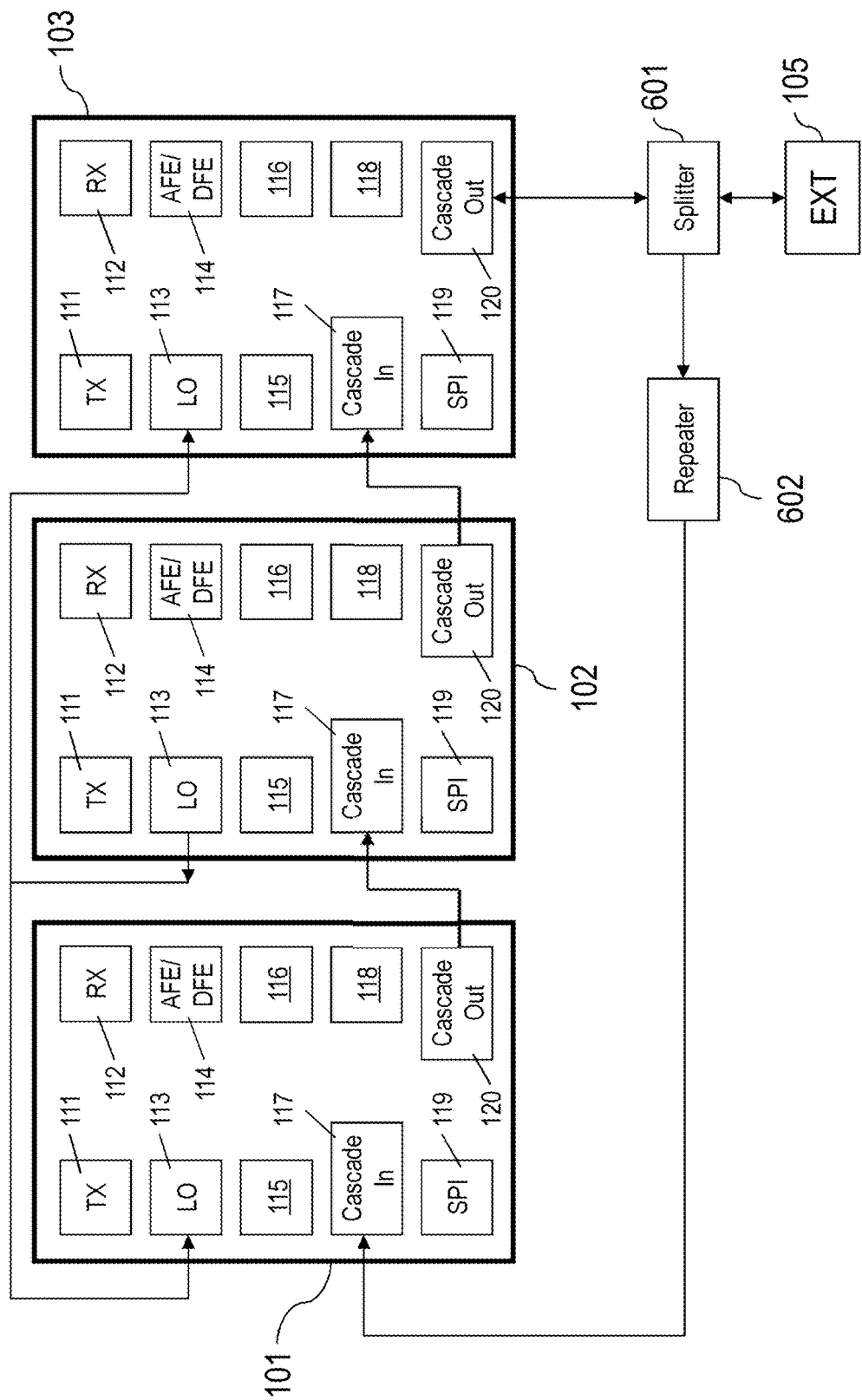
FIG. 6 is based on FIG. 1 and shows a circular cascading scheme by connecting the cascade output port of the MMIC unit that acts as the digital processing master via a splitter to the cascade input port of the first MMIC unit in the chain of cascaded MMIC units.

FIG. 6 is based on FIG. 1. Hence, the MMIC units 101 to 103 are arranged in an efficient way that allow for a cooperative distributed computing. Again, the MMIC unit 103 is the digital processing master and it is arranged such that it is the last in the chain of the MMIC units, i.e. the last MMIC unit among the three cascaded MMIC units 101 to 103. Also, the MMIC unit 102 is the RF (radio frequency) master device. This MMIC unit 102 generates the local oscillator (LO) radar signal and conveys it via the output port of its LO 113 to the other MMIC units 101 and 103, which are the RF slave devices in this example.

The cascade output port 120 of the MMIC unit 103 acting as digital processing master is connected to a splitter device 601. The splitter device 601 is further connected to a repeater 602 and to the external unit 105. It is noted that in all the embodiments described herein the repeater 602 is optional and may be omitted. This repeater 602 may in particular contribute to the signal strength.

The cascade output port 120 of the MMIC unit 103 may comprise differential clock out pins and differential data-out pins, which can be used with or without the splitter device 601 to pass the data towards the repeater 602 (or, if the repeater is omitted, to the cascade input port 117 of the MMIC unit 101) and to the external unit 105.

In an exemplary embodiment, messages conveyed via the cascade output port 120 of the MMIC unit 103 may have different tags and/or identifiers that allows for filtering of the incoming data by the external unit 105, e.g., the ECU that is connected to such a radar arrangement as shown in FIG. 6.

As an option, the splitter device 601 may be an LVDS signal splitter (LVDS: low voltage differential signaling according to or based on ANSI/TIA/EIA-644-1995).

Also, the repeater 602 may be an LVDS repeater. As an option, the LVDS signal splitter and/or the LVDS repeater may use the same communication pins as are used for the cascade input ports 117 and the cascade output ports 120.

The repeater 602 is further connected to the cascade input port 117 of the MMIC unit 101. If the repeater 602 is omitted, the splitter 601 is connected (directly or indirectly) to the cascade input port 117 of the MMIC unit 101.

Hence, in contrast to the scenario shown in FIG. 1, the circular cascading approach according to FIG. 6 does not require a connection between the MMIC units 101 to 103 via the SPI 119.

In the exemplary arrangement of FIG. 6, a circular data flow is achieved from the MMIC unit 101 to the MMIC unit 102 and further to the MMIC unit 103 (being the digital processing master). The MMIC unit 103 conveys (a part of) the data back to the cascade input port 117 of the MMIC unit 101. Each of the MMIC units 101 to 103 hence are arranged to provide partial computations (CI and/or NCI).

Dedicated hardware may be used for conducting the partial computations. It is an option that such dedicated hardware may be arranged between the cascade input port 117 and the cascade output port 120 of each MMIC unit (see also FIG. 4). Such dedicated hardware may be provided by physical design and/or functional design of the MMIC unit. The dedicated hardware may in particular be configurable such that either CI or NCI is performed.

Master-Slave-Communication: In this example, the digital processing master (i.e. the MMIC unit 103) and the digital processing slaves (i.e. the MMIC units 101 and 102) are coupled utilizing a buffer to pass and/or process messages.

It is in particular an option that the cascade output port 120 comprises such a buffer.

It is also an option that the cascade output port 120 of the respective MMIC unit is capable of a bidirectional communication.

Slave-Master-Communication: In the example shown in FIG. 6, a fast cascading unidirectional link is used to convey information from the MMIC unit 101 to the MMIC unit 102 and then to the MMIC unit 103. The cascading unidirectional link utilizes the cascade input ports 117 and the cascade output ports 120 of the MMIC units 101 to 103.

Via this fast cascading unidirectional link, differential clock signals and differential data may be conveyed. Also, partial computing results like partial non-coherent integration of data may be supplied by the individual MMIC units. Further, data of selected FFT peaks may be processed and passed on.

Master-to-Car-Communication: The digital processing master (here the MMIC unit 103) may advantageously have a connection to the external unit 105, e.g., the vehicle or the car (e.g., an electronic control unit (ECU) of the car) via its cascade output port 120.

Based on the circular communication depicted in FIG. 6, any MMIC unit can exchange data with any other MMIC unit. Hence, a communication via the SPI (or the SPI as such) may be omitted.

Figure 7:
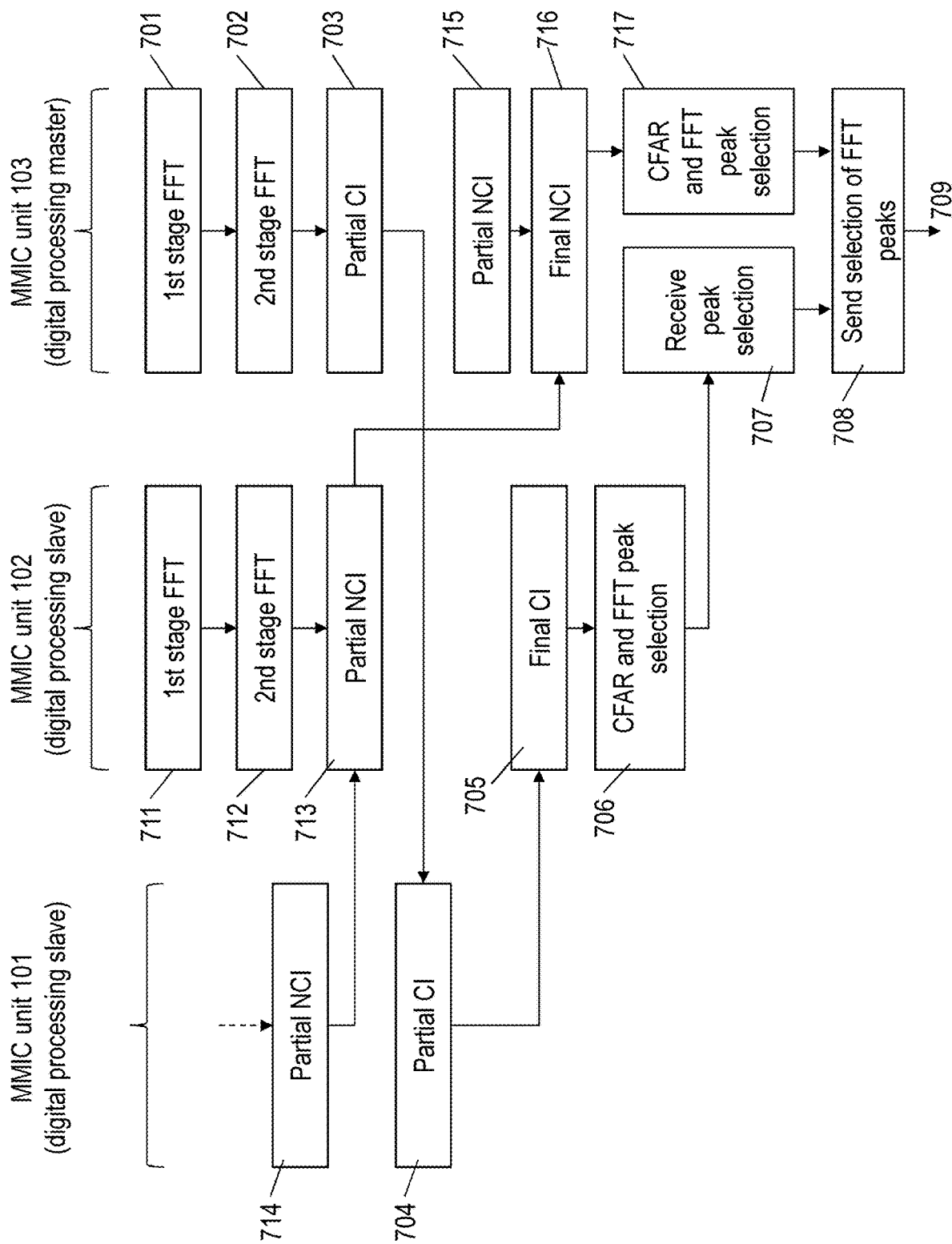
FIG. 7 shows an exemplary data flow between the MMIC units visualizing a distributed computation.

FIG. 7 visualizes an exemplary data flow between the MMIC units 101, 102 and 103.

As before, the MMIC unit 103 acts as the digital processing master and the MMIC units 101 and 102 act as the digital processing slaves.

In a step 701, the MMIC unit 103 conducts a first stage FFT, then in a step 702 a second stage FFT and in a subsequent step 703 a partial coherent integration (CI).

After step 702 has been conducted, the MMIC unit 103 via commands (which were omitted in FIG. 7 in order to increase legibility) instructs the MMIC unit 101 to conduct a partial non-coherent integration (NCI), which triggers a step 714;
the MMIC unit 101 to conduct a partial CI, which triggers a step 704; and
the MMIC unit 102 to conduct a partial NCI, which triggers a step 713.

The commands might be conveyed from the MMIC unit 103 to the MMIC units 101 and 102 via a propagated messaging utilizing the circular arrangement shown in FIG. 6: Hence, the MMIC unit 103 transmits via its cascade output port 120 the commands via at least one message across the splitter 601 back to the cascade input port 117 of the MMIC unit 101 (which as explained above is the first MMIC unit in the chain). The MMIC unit 101 receives this at least one message, analyzes its content and determines whether there is a command or an instruction for itself. Also, the MMIC unit 101 forwards the at least one message via its cascade output port 120 to the cascade input port 117 of the MMIC unit 102. The MMIC unit 102 acts accordingly, i.e.

it analyzes its content and determines whether there is a command or an instruction for itself. Also, the MMIC unit 102 forwards the at least one message via its cascade output port 120 to the cascade input port 117 of the next unit in the chain, here to the MMIC unit 103. By receiving the at least one message, the MMIC unit 103 becomes aware that the circular communication to the digital processing slaves was successful and can act accordingly. From a functional standpoint, this propagated messaging may be perceived as a broadcast message conveyed from the MMIC unit 103 to the other MMIC units 101 and 102 of the chain.

Utilizing this propagated messaging mechanism, the MMIC unit 103 (being the digital processing master) is able to instruct the MMIC units 101 and 102 (the digital processing slaves) what to do.

Hence, subsequent to the step 703, which was performed by the MMIC unit 103, the result of this step 703 is conveyed via the circular communication to the MMIC unit 101, which does the next stage of the partial CI in the step 704. The MMIC unit 101 may utilize the data resulting from step 703 as well as it may calculate a portion of the partial CI by itself and combine the results, which are then transmitted via its cascade output port 120 to the cascade input port 117 of the MMIC unit 102. The MMIC unit 102 in this example conducts the final CI in a step 705 based on the results provided by the MMIC unit 101 and (optionally) based on results determined by itself. In a subsequent step 706, the MMIC unit 102 conducts a CFAR and FFT peak selection. The result of this step 706 are conveyed via its cascade output port 120 to the cascade input port 117 of the MMIC unit 103. In a step 707, the MMIC unit 103 receives the peak selection.

Hence, the CI is distributed across the MMIC unit 103, the MMIC unit 101 and the MMIC unit 102, which does the final CI and conveys the results back to the MMIC unit 103.

As explained above, the MMIC unit 101 is triggered to conduct a partial NCI in the step 714. It is noted the prior to the partial NCI, the MMIC unit 101 may also have conducted a first and second stage FFT (not shown in FIG. 7). The result of the partial NCI computed in step 714 is transmitted via the cascade output port 120 of the MMIC unit 101 to the cascade input port 117 of the MMIC unit 102. The MMIC unit 102 has been triggered to conduct a partial NCI, which it does in step 713 based on results provided by the MMIC unit 101 and (optionally) based on results determined by itself. The results of the partial NCI computed in step 713 are transmitted via the cascade output port 120 of the MMIC unit 102 to the cascade input port 117 of the MMIC unit 103. The MMIC unit 103 has conducted a partial NCI in a step 715 and uses the results of this step 715 and the results from step 713 provided by the MMIC unit 102 to conduct a final NCI in a step 716. In a subsequent step 717, the MMIC unit 103 conducts a CFAR and FFT peak selection based on the results of step 716, i.e. the final NCI.

In a step 708 the FFT peaks selected that are the results of the CI (see step 707) as well as those of the NCI (see step 717) are transmitted to a next processing stage and/or towards the external unit 105 (see arrow 709).

Segmentation of MMIC Unit into RF Device and Processing Device

Figure 8:
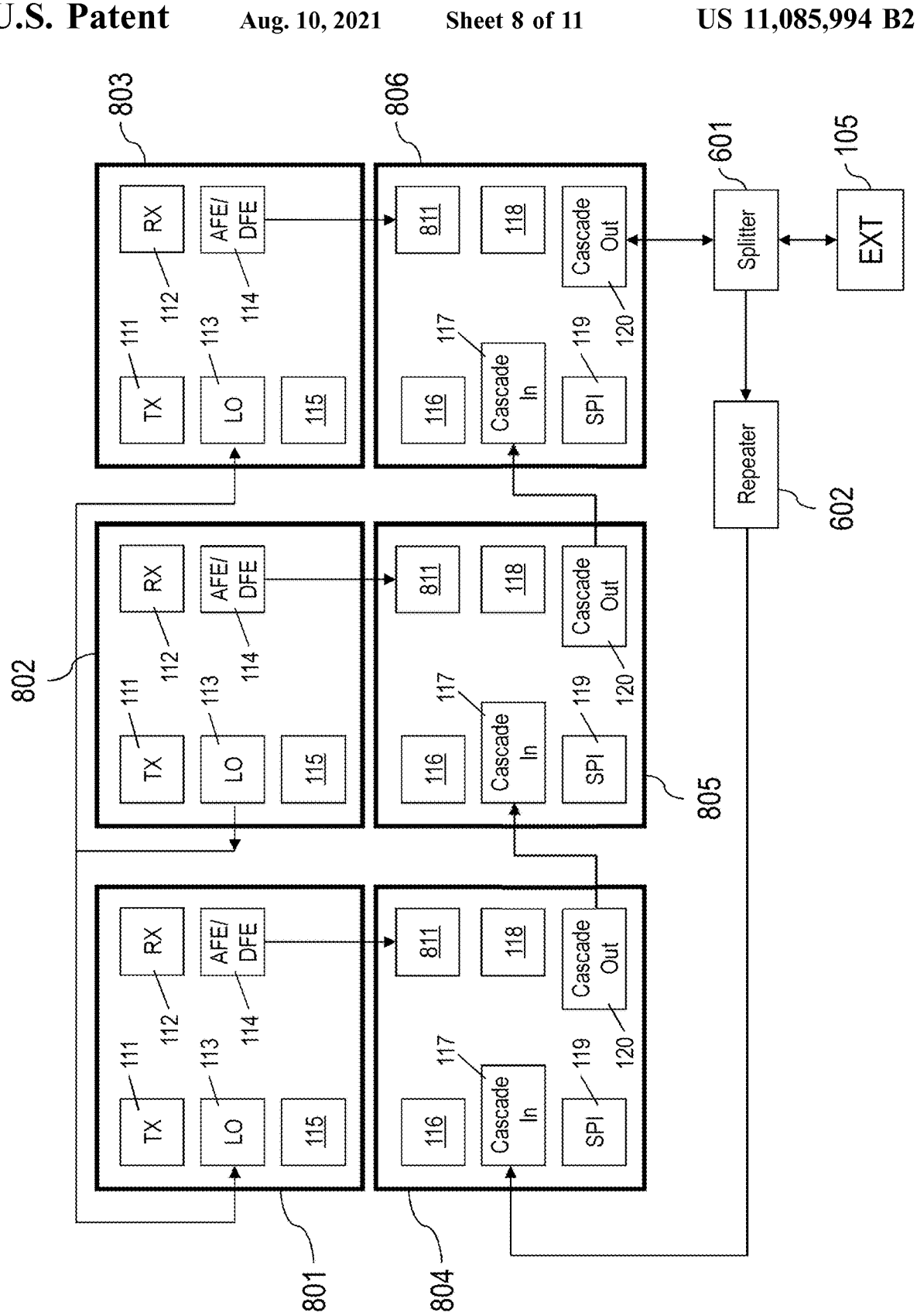
FIG. 8 shows an alternative block diagram based on FIG. 6, wherein each MMIC unit is separated into a processing device and an RF device.

FIG. 8 shows an alternative block diagram based on FIG. 6. In contrast to FIG. 6, each MMIC unit 101 to 103 is separated into an RF device and a processing device. Hence, the MMIC unit 101 is separated into an RF device 801 and a processing device 804, the MMIC unit 102 is separated into an RF device 802 and a processing device 805 and the MMIC unit 103 is separated into an RF device 803 and a processing device 806.

Each RF device 801 to 803 may comprise:
- a transmitter unit 111 (which may comprise several transmitters and at least one antenna, in particular one transmitter per antenna);
- a receiver unit 112 (which may comprise several receivers and at least one antenna, in particular one receiver per antenna);
- a local oscillator (LO) input/output unit 113 (also referred to as LO unit comprising at least one LO port);
- an analog front-end (AFE) and a digital front-end (DFE) 114;
- a ramp generator and a clock generator 115.

Each processing device 804 to 806 may comprise:
- a debug interface 116;
- a cascade input port 117;
- a processing unit 118 comprising at least one of the following: a signaling processing unit (SPU), a central processing unit (CPU) and a memory (RAM);
- optional: a serial peripheral interface (SPI) 119;
- a cascade output port 120;
- an interface 811 that is connected to the AFE/DFE 114 of the associated RF device.

This scenario bears the advantage that one processing device 804 to 806 can be interfaced with at least one RF device 801 to 803. This introduces another degree of flexibility. In an exemplary scenario, each processing device may be interfaced with two or more RF devices.

Communication Via Ethernet Switch

Figure 9:
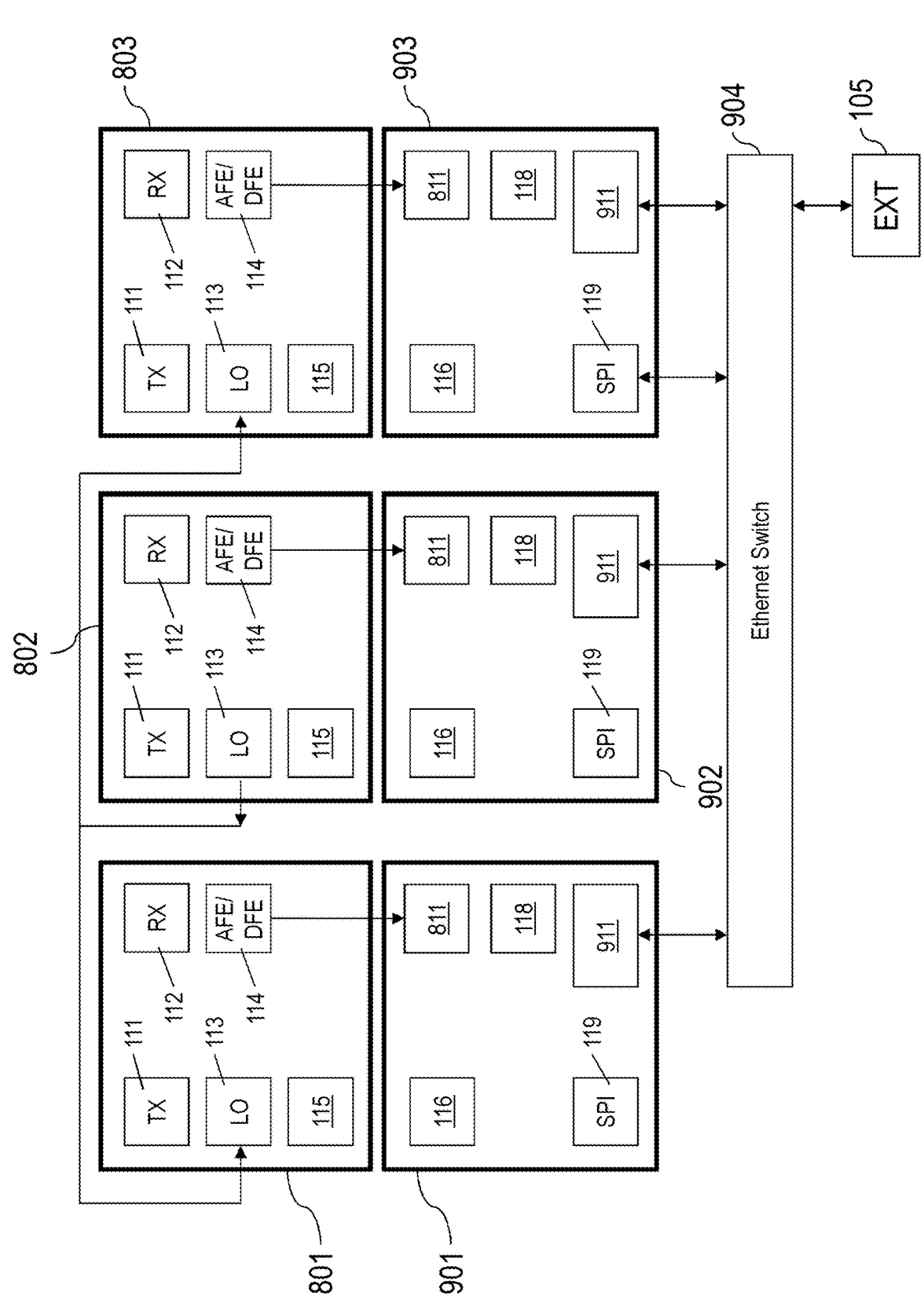
FIG. 9 shows another exemplary diagram to allow for a coordinated distributed (pre-)processing utilizing an Ethernet switch.

FIG. 9 depicts another exemplary diagram to allow for a coordinated distributed (pre-)processing.

The diagram of FIG. 9 is based on the arrangement shown in FIG. 8. However, in contrast to FIG. 8, the RF device 801 is coupled to a processing device 901, the RF device 802 is coupled to a processing device 902 and the RF device 803 is coupled to a processing device 903.

Each of the processing devices 901 to 903 comprises a communication interface 911 instead of the cascade input port 117 and the cascade output port 120.

The communication interfaces 911 of the processing devices 901 to 903 are coupled to an Ethernet switch 904. The Ethernet switch 904 is also coupled to the external unit 105.

The SPI 119 of the processing device 903 may be connected to the Ethernet switch 904 to allow for a configuration of the Ethernet switch 904 and in particular for configuring the communication between the processing devices 901 to 903 via the Ethernet switch 904.

This example allows utilizing common Ethernet components for communication purposes. It is noted that any bus system other than Ethernet may be used accordingly.

Bi-Directional Communication Between Processing Devices

Figure 10:
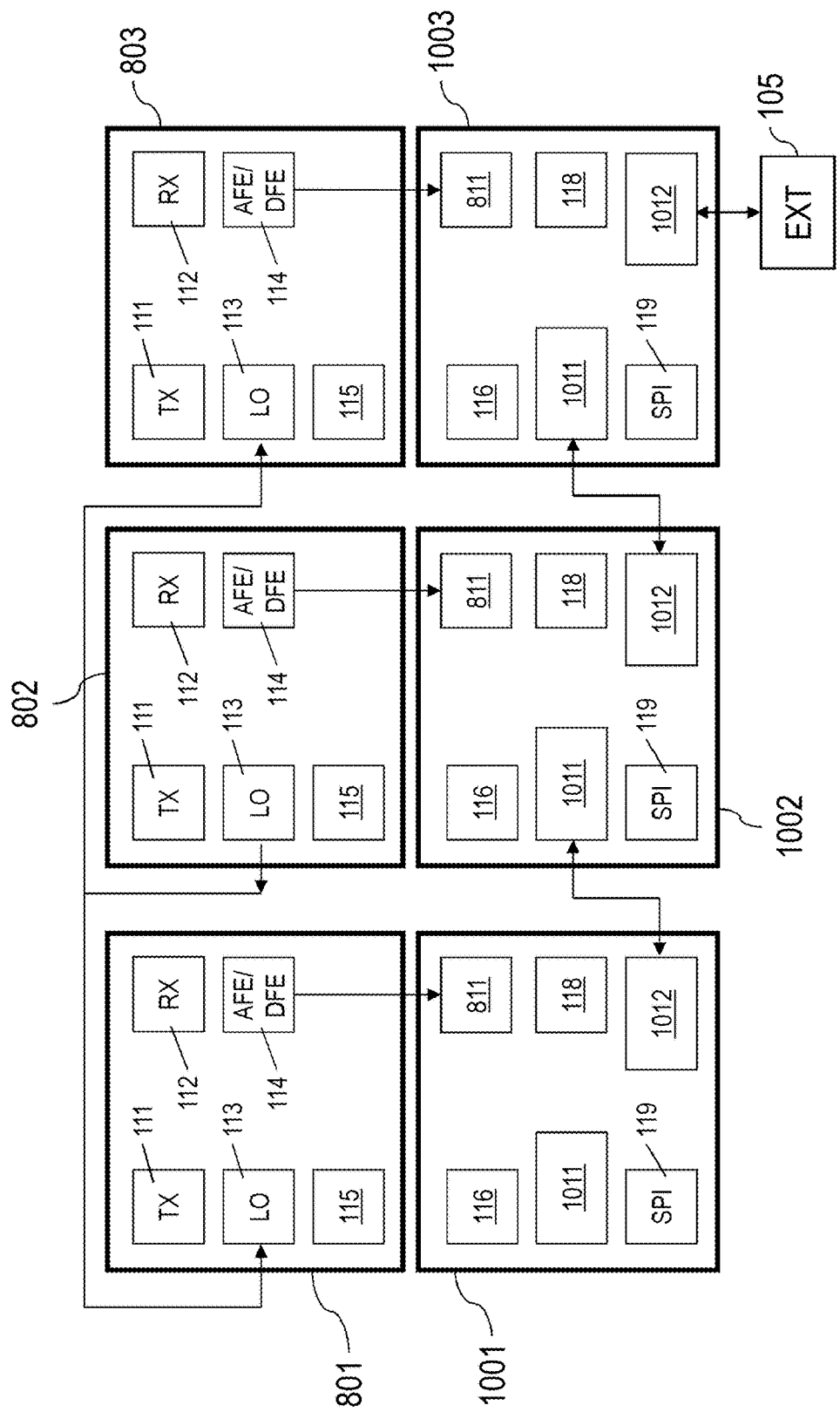
FIG. 10 shows an alternative diagram to allow for a coordinated distributed (pre-)processing utilizing bi-directional links between the processing devices.

FIG. 10 shows an alternative diagram to allow for a coordinated distributed (pre-)processing.

The diagram of FIG. 10 is based on FIG. 9. However, in contrast to FIG. 9, the RF device 801 is coupled to a processing device 1001, the RF device 802 is coupled to a processing device 1002 and the RF device 803 is coupled to a processing device 1003.

Each of the processing devices 1001 to 1003 comprises an communication interface 1011 and an communication interface 1012.

A bidirectional communication between the processing device 1001 and the processing device 1002 is implemented via a bidirectional connection between the communication interface 1012 of the processing device 1001 and the communication interface 1011 of the processing device 1002. Further, a bidirectional communication between the processing device 1002 and the processing device 1003 is implemented via a bidirectional connection between the communication interface 1012 of the processing device 1002 and the communication interface 1011 of the processing device 1003.

This enabled a flexible and bidirectional communication between the processing devices 1001, 1002 and 1003.

Each of the communication interfaces 1011 and 1012 may be a bidirectional communication interface that enables a first data flow in a first direction and a second data flow in a second direction, which is opposite to the first direction. For explanatory purposes it is assumed that the first direction is the direction pointing towards the MMIC unit 103 and the second direction is the direction pointing toward the MMIC unit 101.

Hence, as explained with regard to FIG. 6 and FIG. 7 in view of the circular communication, the MMIC unit 103 via its cascade output port 120 is able to reach the cascade input port 117 of the MMIC unit 101.

In the example shown in FIG. 10, the MMIC unit 103 is able to reach the MMIC unit 101 utilizing the communication interfaces 1011 and 1012 in the second direction (i.e. the direction pointing towards the MMIC unit 101). In this case, a message and/or data to be conveyed from the MMIC unit 103 to the MMIC unit 101 is/are transmitted by utilizing the communication interfaces 1011 and 1012 in the second direction; in this example, the message and/or data is/are forwarded by the MMIC unit 102.

With regard to utilizing a data flow in the direction towards the MMIC unit 103, the communication interfaces 1011 and 1012 are utilized as cascade input ports 117 and cascade output ports 120 as described above.

Two RF Devices Associated With a Single Processing Device

Figure 11:
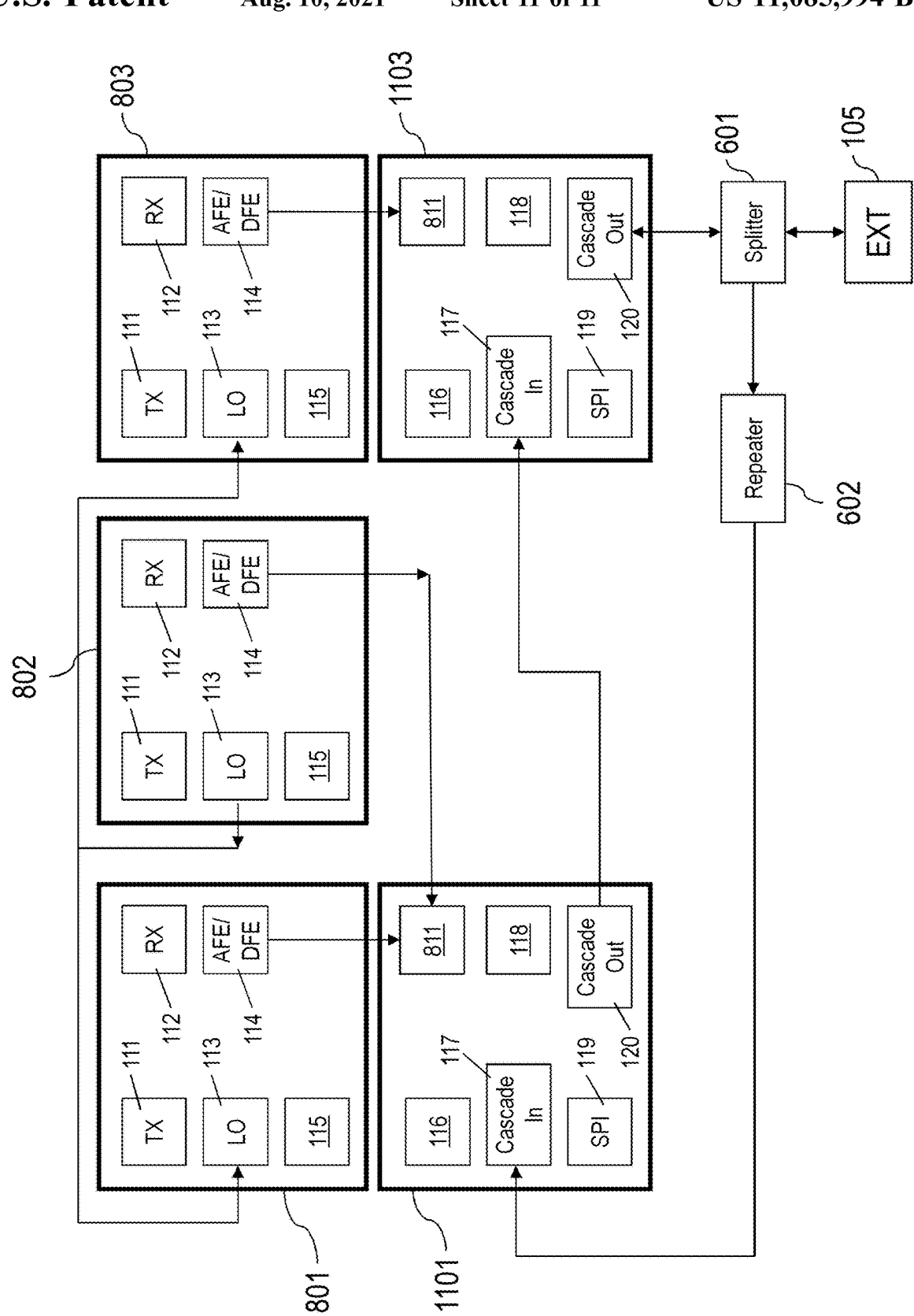
FIG. 11 shows another diagram to allow for a coordinated distributed (pre-)processing, wherein one processing device is coupled with two RF devices.

FIG. 11 shows yet another diagram to allow for a coordinated distributed (pre-)processing.

The diagram of FIG. 11 is based on FIG. 8. However, in contrast to FIG. 8, the RF device 801 is coupled to a processing device 1001, the RF device 802 is also coupled to the processing device 1101 and the RF device 803 is coupled to a processing device 1103 (i.e. the interface 811 of the processing device 1103).

Also the cascade output port 120 of the processing device 1101 is coupled to the cascade input port 117 of the processing device 1103.

This shows that the processing device 1103 is coupled to two RF devices 801 and 802.

For all scenarios shown above, the SPI 119 may be used for (additional) communication purposes as well (as is shown in FIG. 1). Also, the feedback loop from the cascade output port 120 of the processing device 1103 to the cascade input port 117 of the processing device 1101 is optional as well in case the communication between the processing devices 1101 and 1103 is bidirectional (employing bi-directional communication interfaces instead of the cascade input/output ports).

Advantages and Further Aspects

Examples described herein in particular refer to radar systems utilizing coordinated distributed computing thereby enabling distributed resources, e.g., memory and/or processing resources. This distributed approach allows efficiently using different devices and thus improve the performance of radar signal (pre-)processing.

Each unit may be an MMIC unit or a combination of at least one RF device and a processing device. Several such units are used to provide coordinated distributed computation to supply (pre-)processed radar signals.

One unit is the digital processing master, the remaining units are the digital processing slaves. Also one unit (which may be the digital processing master or any of the digital processing slaves) is the RF master device and the remaining units are the RF slave devices. Hence, the RF master device can be assigned independently from assigning the digital processing master.

Several units may be linked (chained) together, wherein the last member of the chain may be the digital processing master. Each of the units may have an cascade input port and a cascade output port; the cascade output port is connected to the cascade input port of the next unit and so forth. The cascade input port of the last unit of the chain (this unit being the digital processing master) may be connected to the cascade output port of the previous unit. The cascade output port of the digital processing master may thus supply the result of the computation, e.g., to an external unit and/or to a previous unit of the chain, in particular to the first unit of the chain.

It is an option that functionalities of the RF device (master or slave) can be combined with functionalities of the digital processing device (master or slave).

Based on the distributed computations, a data reduction may be achieved in at least one unit, before forwarding data to the subsequent unit.

It is an option that a circular cascading is employed, which in particular utilizes a unidirectional connection (link) between the units. As an example, such circular cascading can be provided by conveying data from the digital processing master being the last unit in the chain data back to the first unit in the chain (or at least to at least one previous unit of this chain of units).

It is also an option that the digital processing master being the last unit in the chain supplies the result of the radar signal computation to an external unit. This external unit may be a control unit of a vehicle or any other processing unit that may utilize such results. In an example, the digital processing master may share an interface with the external unit. The digital processing master and the external unit may be connected to a bus system, e.g., an Ethernet connection or any shared medium.

The external unit may supply data towards the external unit and also to at least one previous unit in the chain. Such data may be tagged for filtering purposes. This allows the external unit to filter only the results and not process intermediate data that is destined to be (re-)circulated towards the previous units of the chain.

Also, tracing of data (in particular raw data, e.g., decimated analog-to-digital converted results) is provided via the unidirectional communication (cascaded communication link) towards the digital processing master. Tagging can be used for filtering the data, also for recognizing tracing data, e.g., at the unit that compiles and/or utilizes the tracing data. Tagged tracing data can be filtered and processed separately from the payload (i.e. computation results or intermediate computation results).

Each unit may comprise a certain type of memory and/or buffer (e.g., flash memory). Hence, intermediate results can be buffered for a particular bin, chirp or ramp until the remaining parameters are available to conduct the required computation.

A "bin" may in particular refer to at least one sample, a frequency or a frequency rage (e.g., a ramp of frequencies)

that could be associated with a potential target (i.e. at least one potential target). The bin may comprise at least one FFT result (which may be identified by the CFAR algorithm), it may in particular refer to or be based on at least one FFT result.

The units may communicate via messages. Hence, a coordinated flow of messages may enable the distributed processing among several units. In particular, messages from the unit being the digital processing master to at least one of the digital processing slaves can be used to pass parameters that are required for the computations at the digital processing slaves.

It is an option that the connection to the external unit uses the same serial communication as does the connection between the units of the chain.

The communication between the units of the chain may utilize at least one of the following:
  an unidirectional connection (link),
  a bidirectional connection,
  a serial peripheral interface,
  messaging,
  messaging addressing one unit (unicast),
  messaging addressing at least two units (multicast) or all units (broadcast).

For communication purposes, the ports of the units may be unidirectional ports or bidirectional ports.

It is also an option that the communication between the units of the chain and/or the external unit is facilitated by a switch or gateway, e.g., an Ethernet switch.

Hence, the approach presented in particular solves the problem of cascaded processing utilizing a minor amount of additional memory. The solution detecting interference and/or extracting data of areas of interest in a structured and distributed way.

It is another advantage that the processing load for the external unit is reduced, because the distributed computation scheme presented produces results that can be directly used by the external unit, e.g., an ECU of a car.

It is a further advantage that the hardware resources of the units (e.g., RFCMOS) are efficiently utilized. The amount of memory and performance per unit can be scaled to the number of receiving radar channels.

Another advantage is the flexibility of the solution. Due to the distributed concept, only a few radar transmission channels may be handled per unit, in particular per RFCMOS MMIC.

The examples suggested herein may in particular be based on at least one of the following solutions. In particular combinations of the following features could be utilized in order to reach a desired result. The features of the method could be combined with any feature(s) of the device, apparatus or system or vice versa.

A radar device is suggested, said device comprising
  at least three units, wherein each unit comprises a cascade input port and a cascade output port,
  wherein the at least three units are chained such that the cascade output port of a first unit is connected to the cascade input port of a subsequent unit and that the cascade input port of the last unit of the chain is connected to the cascade output port of its preceding unit,
  wherein the cascade output port of the last unit of the chain is connectable to an external unit;
  wherein the at least three units are arranged to conduct a radar computation in a distributed way such that intermediate results are conveyed towards the last unit of the chain, wherein the last unit of the chain combines these results and supplies them towards its cascade output port.

Hence, a dedicated hardware of the respective unit may be used to provide a portion of the total radar computation and hence contribute its intermediate result (which may to some extend also be a portion of the end result or even an end result that is still to be forwarded) towards the last unit of the chain. This allows to divide the computation onto several units and then combine the results by the last unit in the chain.

It is also noted that the last unit of the chain may combine results which comprise (intermediate) results that are calculated locally by this last unit of the chain.

In an embodiment, the unit is an MMIC unit.

In an embodiment, the unit is an MMIC unit comprising a RFCMOS on a chip.

It is an option that the system is supplied in a package. For example, the RF entity and the processing entity may share one package.

In an embodiment, the MMIC unit further comprises:
  a transmitter unit,
  a receiver unit,
  a local oscillator unit,
  a processing unit.

In an embodiment,
  one of the MMIC units is a radio frequency master and the remaining MMIC units are radio frequency slaves,
  the radio frequency master supplies a signal generated by the local oscillator unit to the radio frequency slaves.

In an embodiment, the radio frequency master is different from the MMIC unit that is the last unit in the chain or that the radio frequency master is the last unit in the chain.

It is another option that the RF master is the same as the MMIC unit that is the last unit in the chain (i.e. the digital processing master).

In an embodiment, the unit comprises a processing device.

In an embodiment, the processing device further comprises
  a processing unit,
  an interface that is connectable to a front-end of at least one radio frequency device.

The interface may be arranged such that is capable of receiving time-domain data.

In an embodiment, the radar device further comprises several radio frequency devices, wherein each radio frequency device comprises:
  a transmitter unit,
  a receiver unit,
  a local oscillator unit,
  a front-end that is coupled to one processing device.

Hence, each radio frequency (RF) device is coupled with one processing device. Each processing device is coupled to at least one RF device. In one example, a processing device may supply two or more RF devices.

The front-end may be coupled to the processing device to transfer time-domain data.

In an embodiment,
  one of radio frequency devices is a radio frequency master and the radio frequency devices are radio frequency slaves,
  the radio frequency master supplies a signal generated by the local oscillator unit to the radio frequency slaves.

In an embodiment, the radar computation in a distributed way comprises at least one of the following:

a CFAR computation, at least one FFT computation, an angular computation, in particular computing an angle and/or an elevation information, a peak computation, a coherent integration, a non-coherent integration, an interference mitigation computation, computing a range information, computing a Doppler information, computing an energy information.

In an embodiment, the last unit of the chain is a digital processing master and the remaining units of the chain are digital processing slaves, the digital processing master coordinates the communication towards the external unit.

In an embodiment, the digital processing master sends instructions to at least one of the remaining units.

In an embodiment, each of the at least three units comprise a serial interface, the digital processing master sends at least one of the instructions to at least one of the digital processing slaves utilizing the serial interface.

In an embodiment, each of the at least three units comprise a communication interface, the communication interfaces of the at least three units are connected to a switch, the digital processing master sends at least one of the instructions to at least one of the digital processing slaves utilizing the communication interface.

In an embodiment, each of the at least three units comprise a bidirectional interface, the digital processing master sends at least one of the instruction to at least one of the digital processing slaves utilizing the bidirectional interface.

In an embodiment, the cascade output port of the digital processing master is directly or indirectly connected to the cascade input port of the digital processing slave that is the first unit of the chain;

the digital processing master sends at least one of the instructions to the first unit of the chain via this connection.

In an embodiment, the cascade output port of the digital processing master is directly or indirectly connected via a splitter and optional via a repeater to the cascade input port of the digital processing slave that is the first unit of the chain.

In an embodiment, each of the units is arranged to supply tracing data at the cascade output port in particular during a time when there is no transmission to the subsequent unit or, in case of the unit being the last unit of the chain, to the external unit.

In an embodiment, the external unit comprises an external switch or an external device, in particular an electronic control unit of a vehicle.

In an embodiment, at least one of the units conducts a data compression or data reduction during the distributed radar computation.

In an embodiment, the last unit of the chain conveys tagged data towards the external unit.

In an embodiment, tracing data is conveyed towards the last unit of the chain during predetermined time intervals from at least one of the at least one units other than the last unit in the chain.

The predetermined time intervals are time intervals when the communication link is not used for conveying other (payload) data. The communication link may in particular be the communication link using the cascade input ports/cascade output ports towards the last unit in the chain. The last unit of the chain may convey the tracing data towards the external unit or towards a component different from the external unit. Such filtering of tracing data may be achieved by a filter unit or a filter functionality. The tracing data may comprise any data for monitoring the operations of the units of the chain.

Also, a method is suggested for processing radar signals via the radar device as described herein.

Further, a computer program product is provided, which is directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A radar device, comprising:
at least three subcircuits each comprising a cascade input port and a cascade output port, wherein the at least three subcircuits are chained such that the cascade output port of a first subcircuit is connected to the cascade input port of a subsequent subcircuit, the cascade input port of the last subcircuit of the chain is connected to the cascade output port of its preceding subcircuit, and the cascade output port of the last subcircuit of the chain is connectable to an external device,
wherein the at least three subcircuits are configured to conduct a radar computation in a distributed manner such that intermediate results are conveyed towards the last subcircuit of the chain, and the last subcircuit of the chain is configured to combine these results and supply them towards its cascade output port,
wherein the last subcircuit of the chain is a digital processing master and the remaining subcircuits of the chain are digital processing slaves, and the digital processing master is configured to coordinate the communication towards the external device, and
wherein the cascade output port of the digital processing master is connected to the cascade input port of the digital processing slave that is the first subcircuit of the chain, and the digital processing master is configured to send at least one of the instructions to the first subcircuit of the chain via this connection.

2. The radar device according to claim 1, wherein each of the subcircuits is a Monolithic Microwave Integrated Circuit (MMIC).

3. The radar device according to claim 2, wherein each of the subcircuits is an MMIC comprising a Radio Frequency Complementary Metal Oxide Semiconductor (RFCMOS) on a chip.

4. The radar device according to claim 2, wherein each of the MMICs comprises:
a transmitter;
a receiver;
a local oscillator; and
a processor.

5. The radar device according to claim 2, wherein one of the MMICs is a radio frequency master and the remaining MMICs are radio frequency slaves, and the radio frequency master is configured to supply a signal generated by the local oscillator to the radio frequency slaves.

6. The radar device according to claim 5, wherein the radio frequency master is different from the MMIC that is the last subcircuit in the chain.

7. The radar device according to claim 5, wherein the radio frequency master is the last subcircuit in the chain.

8. The radar device according to claim 5, wherein each of the subcircuits comprises:
a processor; and
an interface that is connectable to a front-end of at least one radio frequency device.

9. The radar device according to claim 8, further comprising several radio frequency devices, wherein each radio frequency device comprises:
a transmitter;
a receiver;
a local oscillator; and
a front-end that is coupled to one processor.

10. The radar device according to claim 9, wherein one of radio frequency devices is a radio frequency master and the remaining radio frequency devices are radio frequency slaves, and the radio frequency master is configured to supply a signal generated by the local oscillator to the radio frequency slaves.

11. The radar device according to claim 1, wherein the radar computation in a distributed manner comprises at least one of the following:
a Constant False Alarm Rate (CFAR) computation,
at least one Fast Fourier Transform (FFT) computation,
an angular computation computing an angle or elevation information,
a peak computation,
a coherent integration,
a non-coherent integration,
an interference mitigation computation,
computing a range information,
computing a Doppler information, and
computing an energy information.

12. The radar device according to claim 1, wherein the digital processing master is configured to send instructions to at least one of the remaining subcircuits.

13. The radar device according to claim 1, wherein each of the at least three subcircuits comprises a serial interface, and the digital processing master is configured to send at least one of the instructions to at least one of the digital processing slaves utilizing the serial interface.

14. The radar device according to claim 1, wherein each of the at least three subcircuits comprises a communication interface connected to a switch, and the digital processing master is configured to send at least one of the instructions to at least one of the digital processing slaves utilizing the communication interface.

15. The radar device according to claim 1, wherein each of the at least three subcircuits comprises a bidirectional interface, and the digital processing master is configured to send at least one of the instruction to at least one of the digital processing slaves utilizing the bidirectional interface.

16. The radar device according to claim 1, wherein the cascade output port of the digital processing master is connected via a splitter to the cascade input port of the digital processing slave that is the first subcircuit of the chain.

17. The radar device according to claim 1, wherein each of the subcircuits is configured to supply tracing data at the cascade output port during a time when there is no transmission to the subsequent subcircuit and, in case of the last subcircuit of the chain, to the external device.

18. The radar device according to claim 1, wherein the external device comprises an electronic control unit of a vehicle.

19. The radar device according to claim 1, wherein at least one of the subcircuits is configured to conduct a data compression or data reduction during the distributed radar computation.

20. The radar device according to claim 1, wherein the last subcircuit of the chain is configured to convey tagged data towards the external device.

21. The radar device according to claim 1, wherein tracing data is conveyed towards the last subcircuit of the chain during predetermined time intervals from at least one of the at least one subcircuits other than the last subcircuit in the chain.

22. A method for processing radar signals via the radar device according to claim 1.

23. A non-transitory computer program product directly loadable into a memory of a digital processor, comprising software code portions for performing the steps of the method according to claim 22.

* * * * *